United States Patent [19]
Copeland et al.

[11] 3,738,616
[45] June 12, 1973

[54] MOTOR DRIVEN APPLIANCE

[75] Inventors: William M. Copeland, Villa Park; Worthy L. Chambers, Lombard, both of Ill.

[73] Assignee: Sunbeam Corporation, Chicago, Ill.

[22] Filed: Oct. 30, 1969

[21] Appl. No.: 872,556

[52] U.S. Cl. .............................................. 259/108
[51] Int. Cl. ...................... A47j 43/046, H03j 1/02
[58] Field of Search ................. 259/108, 111, 5–8, 259/18–19, 95, 97, 106, 107, 114; 310/157, 87

[56] References Cited
UNITED STATES PATENTS

| | | | |
|---|---|---|---|
| 2,798,700 | 7/1957 | Corbett et al. | 259/108 X |
| 2,798,979 | 7/1957 | Ernst | 259/104 X |
| 2,059,872 | 11/1936 | Hull | 310/157 X |
| 1,967,033 | 7/1934 | Lipman | 310/157 X |
| 3,318,249 | 5/1967 | Lorser | 310/87 |
| 2,800,310 | 7/1957 | Snyder | 259/108 |
| 2,822,485 | 2/1958 | Braun et al. | 310/157 |
| 3,368,800 | 2/1968 | Barnard | 259/108 |
| 3,458,175 | 7/1969 | Aoki et al. | 259/108 |
| 3,493,215 | 2/1970 | Edwards et al. | 259/108 |

*Primary Examiner*—Geo. W. Larkin
*Attorney*—George R. Clark

[57] ABSTRACT

A motor operated electric appliance having the elements of the motor supported directly on the plastic housing members. The motor field is positioned between two housing members and serves to align the housing members which also support the armature bearings. Air conduit means formed directly in the plastic housing members directs the motor cooling air into the interior of the housing and across the motor for cooling purposes.

5 Claims, 10 Drawing Figures

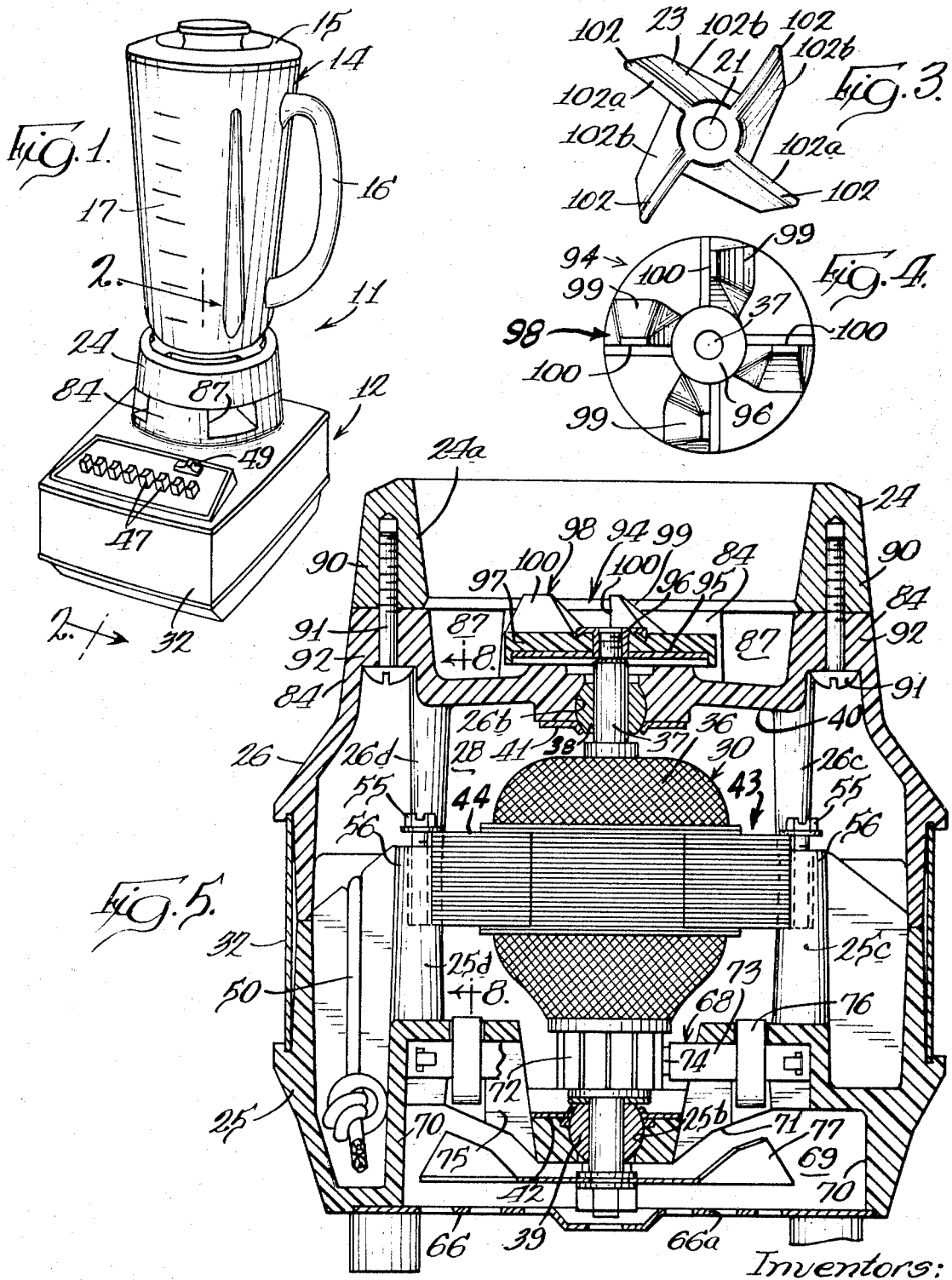

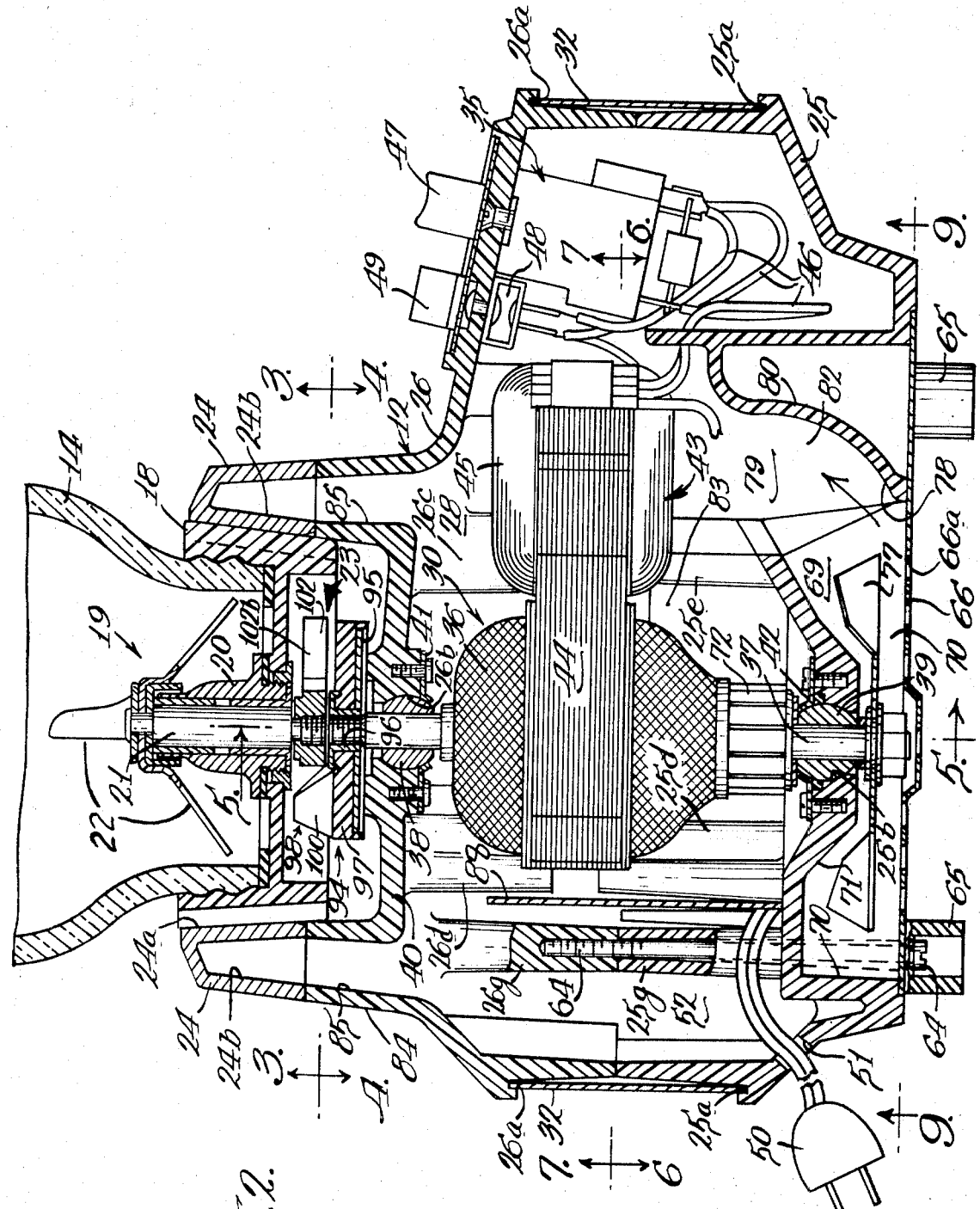

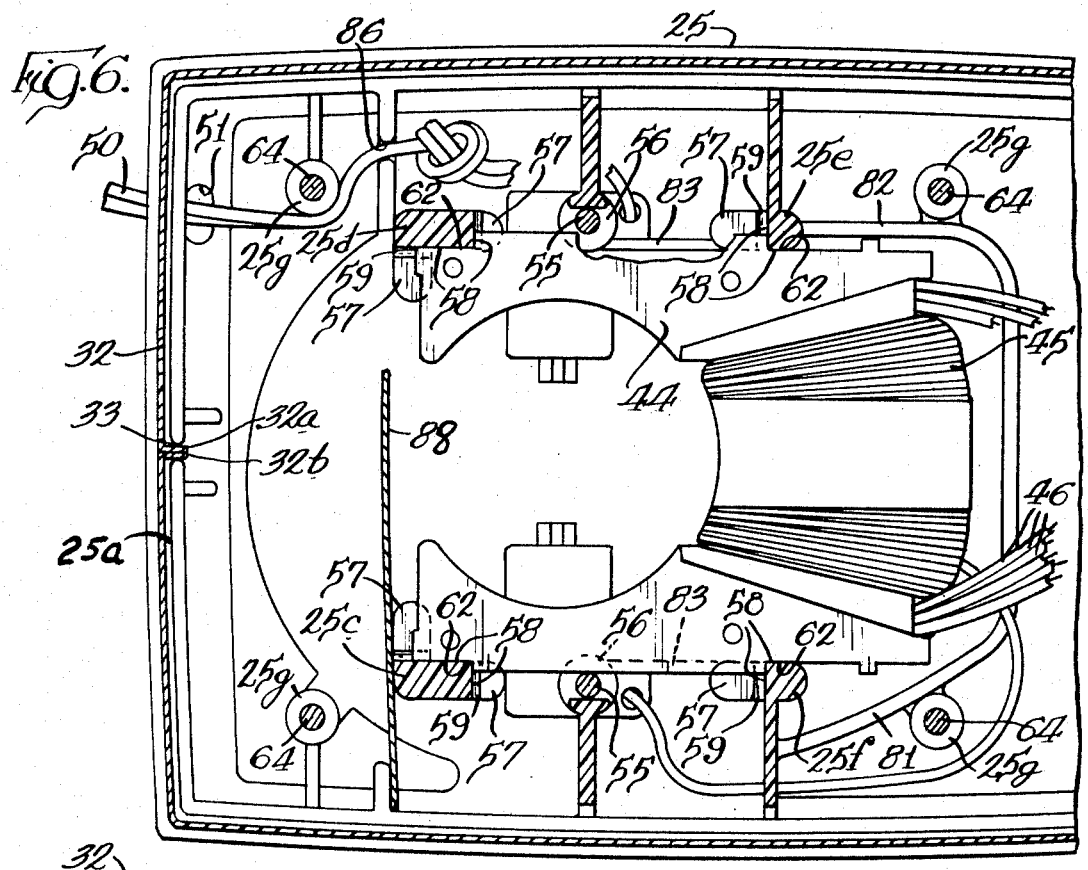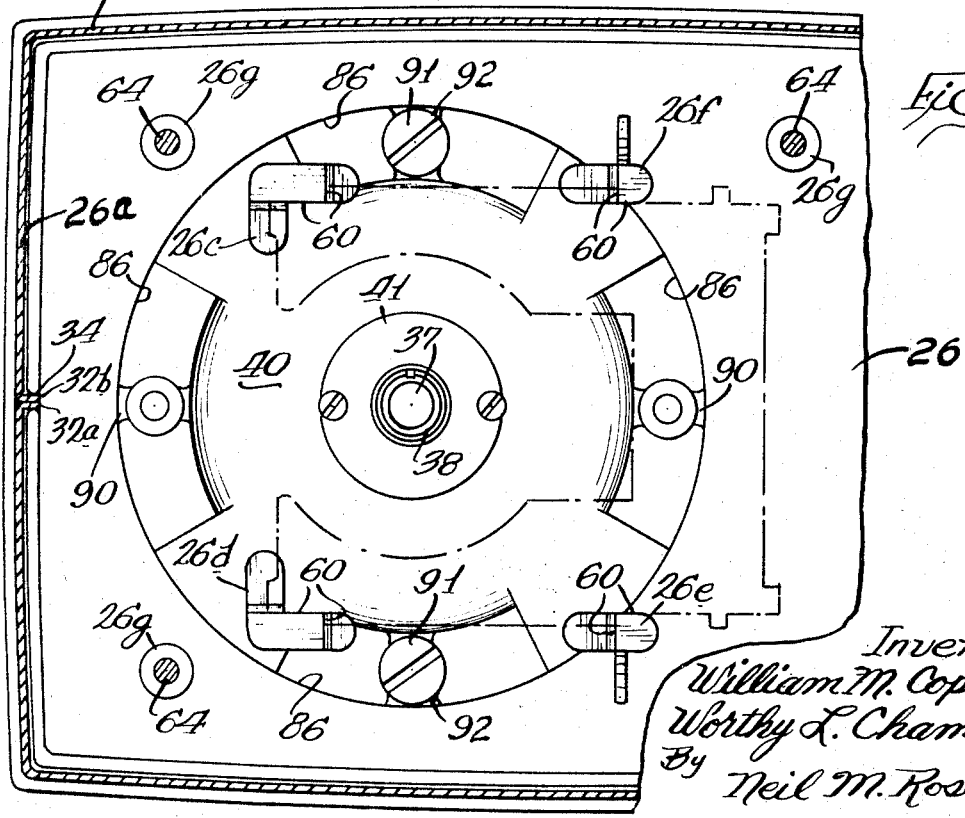

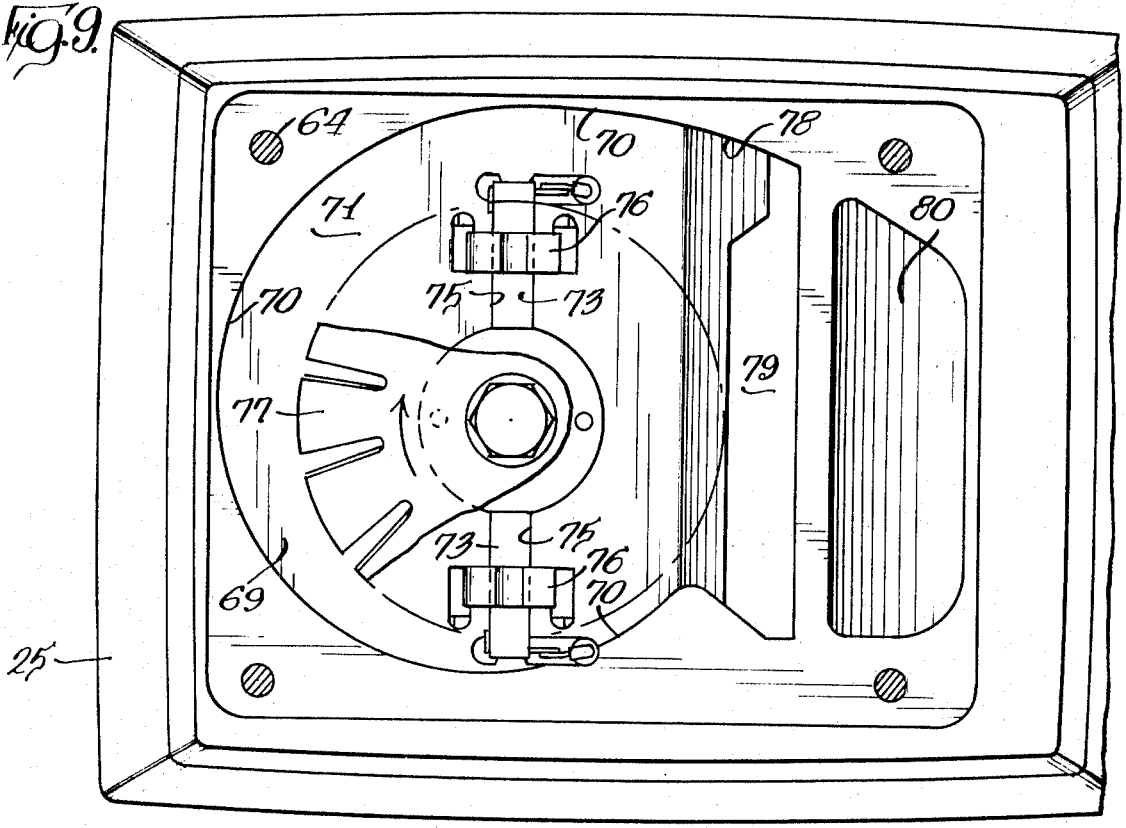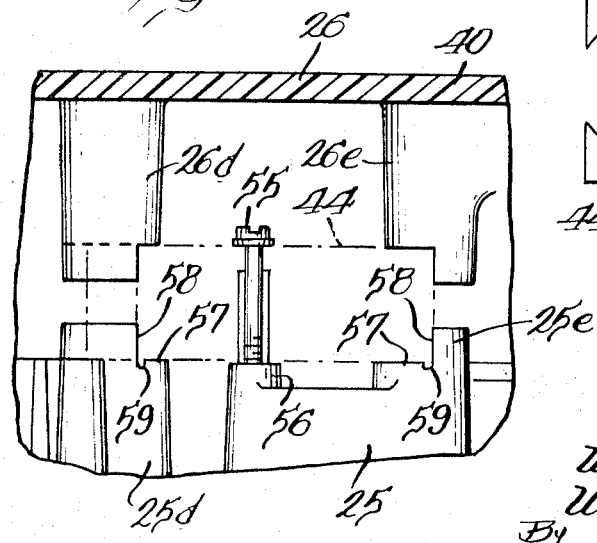

1

MOTOR DRIVEN APPLIANCE

BACKGROUND OF THE INVENTION

The food liquefier or blender has in recent years become one of the more popular food and drink preparation appliances and is found in most well equipped kitchens. The blender is a motor driven appliance which complements an ordinary food mixer in that it performs many food preparation tasks which cannot be performed with the ordinary mixer. The blender conventionally includes an open-topped, upright vessel having a number of knife-like blades positioned at the bottom of the vessel for rotation about a vertical axis. This vessel is supported on a power unit which includes means for detachably connecting a motor driven shaft to the blades which are rotatably supported in the vessel.

The device is intended to rotate the above described blades at relatively high velocity and with considerable power so that foods ranging from liquids to solids may be chopped and mixed quickly and effectively in the vessel. Since the blades are rotated at a high speed, it is conventional to drive the blades directly from the armature shaft of the motor positioned in the power unit and normally no reduction gearing is employed. As a consequence, the structure of the blender power unit is relatively simple involving little more than a housing to enclose a fairly powerful electric motor usually on the order of a quarter to one half horsepower. Because of the involvement of the blender in the food preparation tasks and in view of the positioning of the vessel above the power unit, it is necessary that the housing be made of a design to prevent spillage from entering the housing and so that the housing is adaptable to easy cleaning.

With the increased popularity of the blender in recent years, there has been severe price competition between the many manufacturers of blenders. Accordingly, there have been many attempts to simplify the structure of the blender and thereby effect reduction in the manufacturing costs. In addition, with the increased competition, attempts have been made to improve the blender design and make it a more practical and useful appliance. Exemplary of one such improvement is the trend toward reducing the height of the blender. Since the blender vessel is conventionally positioned above and coaxially with the motor shaft, it is conventional that the total height of the blender vessel when positioned on its power unit is so great that it is inconvenient to store in the usual areas available in the kitchen. Accordingly, efforts have been made to reduce the height of the power unit in order to reduce the overall height of the appliance. This approach was taken in preference to reducing the height of the vessel since it is desirable to have a vessel with maximum volumetric capacity.

There have been attempts in the prior art to simplify the structure of the blender power unit by integrating the motor with the housing for the motor. One such example is shown in Braun et al U.S. Pat. No. 2,822,485. Such an integration of the motor with the housing eliminates the necessity for a separate motor supporting frame and utilizes the housing itself as a means for supporting the field, the motor bearings, and the brushes. In the Braun et al patent and other related developments, there has been no substantial reduction in the complexity in the housing and motor construction. In order to effect the maximum manufacturing economies, the motor and the housing must be designed to complement each other to take advantage of the maximum duplication of function by the various parts of the housing.

SUMMARY OF THE INVENTION

The motor operated blender power unit of the instant invention utilizes a two-piece plastic or phenolic housing which provides an enclosure for the motor and at the same time accurately supports the various elements of the motor in their proper relative positions. The motor utilizes a single coil field construction which is positioned between the plastic housing members with the field serving to locate the housing members relative to each other. This permits the armature bearings, which are mounted one in each of the housing members, to be accurately aligned. The plastic housing members are provided with integral wall portions which form a shroud for the motor cooling fan and provide passageways for delivering the motor cooling air across the portions of the motor which tend to generate the most heat.

The resulting design provides a blender which is low in cost because of the simplicity in the housing and the means supporting the motor elements. In addition, the blender power unit has a low silhouette by virtue of the flat field structure and the fact that the armature bearings are supported at the top and bottom of combined housing and frame members thereby minimizing the space which would normally be required for a separate motor frame.

An object of the present invention is to provide an improved blender design wherein the housing for the power unit comprises housing members which serve to support the various elements of the electric motor contained therein.

A further object of the present invention is to provide a blender having upper and lower housing members which fit together to form the decorative enclosure for the motor and which also perform the functions of supporting the individual elements of the motor and have integrally formed passageways for circulating the motor cooling air.

Another object of the present invention is to provide a power unit for a blender having upper and lower motor frame members which support the various elements of the motor including a laminated field which is positioned between the frame members and which serves to align and position the frame members with respect to each other and with respect to the motor.

Another object of the present invention is to provide a blender power unit having molded phenolic housing members which have integrally formed supports for the motor elements and which include an integrally formed recess within which the motor cooling fan is received and integrally formed passageways which interconnect the fan recess with the protions of the motor to be cooled.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is a perspective view of a motor driven blender embodying our invention;

FIG. 2 is an enlarged sectional view taken along line 2-2 of FIG. 1 with the blender vessel largely cut away;

FIG. 3 is a plan view taken on line 3—3 of FIG. 2 showing the upper blade coupling member in the blender vessel.

FIG. 4 is a plan view taken substantially on line 4—4 of FIG. 2 showing the lower blade coupling member;

FIG. 5 is a vertical sectional view taken substantially on line 5—5 of FIG. 2 with the blender vessel removed;

FIG. 6 is a horizontal sectional view taken along line 6—6 of FIG. 2;

FIG. 7 is a partial horizontal sectional view taken along line 7—7 of FIG. 2 with the motor armature and field removed for illustrative purposes;

FIG. 8 is an enlarged fragmentary sectional view taken on line 8—8 of FIG. 5;

FIG. 9 is a bottom view of the blender power unit shown in FIGS. 2 and 3 with the bottom closure plate removed to expose the motor cooling fan and its shroud structure; and FIG. 10 is a schematic circuit diagram of the blender.

BRIEF DESCRIPTION OF THE PREFERRED EMBODIMENT

Referring now to the drawings in which like parts are designated by like numerals in the various views, there is shown our improved motor operated blender which is designated generally by reference numeral 11. The blender 11 includes a base or power unit 12 which supports on the upper surface thereof an upright open-topped vessel 14. The vessel 14 includes a removable top 15 which permits access to the interior of the vessel for the purpose of adding liquids and solids which are to be mixed and blended therein. The vessel 14 is provided with a handle 16 and measuring graduations 17 which facilitate the use of the vessel in accomplishing various food preparation chores.

The bottom of the vessel is closed by means of a detachable closure 18 which supports at its midpoint a rotating blade assembly 19. The blade assembly 19 consists of a hub or bearing support 20 through which a stub shaft 21 extends with cutting and chopping blades 22 supported at the upper end thereof and a coupling member 23 supported at the lower end thereof at a point external from the vessel 14. The coupling member 23 comprises part of the means for drivingly interconnecting the power unit 12 to the blade assembly 19 as will be more completely described below.

For the purpose of supporting the vessel 14 on the power unit 12, there is provided a circular ring 24 which has a somewhat conical interior surface 24a adapted for gripping engagement with the conical exterior surface of the bottom closure 18. The engagement between the conical surfaces on the ring 24 and the closure 18 supports the vessel 14 accurately with the friction between the steeply angled surfaces, tending to retain the vessel 14 firmly seated thereon. The support ring 24 and the bottom closure 18 are formed with interengaging means (not shown) which prevent rotation of the vessel 14 with respect to the power unit 12.

The power unit 12 is made up of two molded phenolic or plastic frame members one being a base or lower housing member 25 and the other being a cover or upper housing member 26. The housing members 25 and 26 are of intricate designs since they perform certain motor supporting functions which will be more completely described below. Because of these functions and the fact that the elements of the motor must be held in accurate alignment, the housing members 25 and 26 are molded of relatively high strength and rigid plastic such as a phenolic or polycarbonate. Members 25 and 26 are somewhat cup-shaped or box-like being rectangular in shape when viewed from above and have abutting walls which form an enclosure 28 within which a motor 30 is mounted. In order to enhance the appearance of the power unit 12 and in order to obscure the line along which the housing members 25 and 26 abut, there is provided a decorative trim piece or wrap-around 32 which temrinates at each end with inturned ends 32a and 32b as are best shown in FIGS. 6 and 7. The side walls of the upper and lower housing members 25 and 26 are formed with aligned slots 33 and 34, respectively, into which the inturned ends 32a and 32b extend. This provides a construction in which, when the housing members 25 and 26 are assembled together, the wrap-around 32 is trapped in channels 25a and 26a which extend completely around the entire power unit 12. The ends of the wrap-around are turned inwardly into the slot 33 for decorative purposes only since the wrap-around 32 in its rectangular form trapped in channels 25a and 26a is completely restrained with respect to housing members 25 and 26.

Considering the sectional view of the power unit 12 shown in FIG. 2, it is noted that the enclosure 28 is formed so that it is broken up into three more or less separate and distinct portions. The center portion of the enclosure 28 supports the motor 30 while the front portion of the enclosure 28 encloses a push button switch 35. The rear portion of the enclosure 28 provides a space which may be utilized for cord storage as will be explained in greater detail below.

The motor 30 is positioned with an armature 36 supported for rotation about a vertical axis by means of armature shaft 37 which is journalled in an upper bearing 38 and a lower bearing 39. The bearings 38 and 39 are conventional oil impregnated bearings of generally spherical external shape which are mounted in the housing members 25 and 26. The bearing 38 is received in an opening 26b formed in top wall 40 of the upper housing member 26. A conventional bearing retainer 41 retains the bearing 38 seated directly in the housing member 26. Similarly, the lower housing member 25 is formed with an opening 25b through which the armature shaft 37 extends and in which the lower bearing 39 is supported and retained by means of bearing retainer 42.

The motor 30 includes a single coil stator 43 which is made up of a U-shaped laminated core 44 and a single tapped coil 45 which is wound directly on the bight of the U-shaped core with an epoxy coating on the laminated core 44 to electrically insulate the coil from the core and to prevent shorting of the windings, the coating being in lieu of a coil bobbin. The taps in the coil 45 are connected by leads 46 to the switch 35 which permits the power unit 12 to be operated at various speeds in a more or less conventional manner. In the disclosed embodiment, the switch 35 has eight push buttons 47 which permit the power unit to be operated at eight different speeds. Positioned on the upper housing member 26 adjacent the speed control switch 35 is an additional switch 48 which is connected in series with the speed control switch 35 as shown in FIG. 10. The switch 48 is a three positioned switch which is controlled by a sliding actuator 49 positioned adjacent the push buttons 47. The switch 48 has a center "off" position for the actuator 49 in which the switch 48 is open. When the switch actuator 49 is slid to the right as shown in FIG. 1, the circuit is closed through the speed control switch 35. When the actuator 49 is pushed to the left, a "momentary on" condition is achieved. Spring means are included in switch 48 so that if the actuator 49 is released when in the "momentary on" position, the switch 48 and actuator 49 again move to the "off" position as a consequence of the spring means.

The motor 30 is connected to a suitable source of power by means of a power cord 50 which enters the power unit 12 through an opening 51 in the back of the lower housing member 25 as is best shown in FIG. 2. The power cord extends into a cord storage area 52 which is available for storing any excess length of the power cord 50 which is not needed to interconnect the power unit 12 to a convenient electrical outlet.

The stator 43 and its laminated core 44 are supported within the power unit 12 by means of four vertically extending projections or posts 25c, 25d, 25e, and 25f and corresponding vertical downwardly extending projections or posts 26c, 26d, 26e, and 26f. These field or stator supporting posts engage the stator 43 locating it accurately so as to provide the desired uniform air gap between the stator 43 and the armature 36. The stator 43 is secured to the lower housing member 25 by means of a pair of screws 55 which are threadedly received in upwardly extending bosses 56 formed in the lower housing member. The upper portions of the posts 25c, 25d, 25e, and 25f are provided with accurately formed, horizontal and vertical locating surfaces which engage the core 44. As best shown in FIGS. 6 and 8, the posts 25c, 25d, 25e, and 25f are formed with horizontal engaging surfaces 57 which engage the lower surface of the core 44 and with vertically extending locating surfaces 58 which locate the core 44 in the horizontal plane. It should be noted that at the intersection of each of these locating surfaces 57 and 58, there are relieved grooves or channels 59 which eliminate any interfering radii or fillets in the plastic material in these sections and permit the laminated core 44 to accurately and completely abut these locating surfaces 57 and 58.

The locating projections 26c, 26d, 26e, and 26f which extend downwardly from the upper housing member 26 serve to accurately locate the upper housing member 26 with respect to both the field 43 and the lower housing member 25. Thus, the alignment of the armature bearings 38 and 39 in the upper and lower housing members is determined by the interengagement of the supporting projections on the housing members with the laminated core 44. The lower ends of the projections 26c, 26d, 26e, and 26f are provided with vertically extending locating surfaces 60 which engage the sides of core 44 to locate the upper housing member with respect to core 44. This provides a positive and precise means of assuring proper alignment of the armature bearings with respect to the field. The locating portions of the large, plastic housing members 25 and 26 are positioned as closely as possible to the bearing supporting portions thereby minimizing the problems of plastic shrinkage, deformation, etc. in controlling the tolerances between the locating portions and the bearing supporting portions.

To better understand the manner in which the field core 44 is located with respect to the lower housing member 25, reference should be had to FIG. 6. The field core 44 shown therein is made up of generally C-shaped laminations with the legs of the field defining a generally cylindrical opening within which the armature 36 is received. The coil 45 is wound on the bight portion of the field on top of an insulating epoxy coating. The laminations of the core 44 may be secured together by rivets, by welding, or in any conventional manner. The corners of the core 44 adjacent the support posts 25c, 25d, 25e, and 25f are formed with notches 62 which provide vertically extending surfaces positioned at right angles to each other to abut against the vertical locating surfaces 58 on the posts 25c, 25d, 25e, and 25f. This interengagement between the core 44 and the locating posts assures very precise location of the stator 43 with respect to the lower armature bearing 39.

Similarly, as is best shown in FIG. 7, the field core 44 as indicated in dashed lines therein, is positioned so that the vertical locating surfaces 60 on the posts 26c, 26d, 26e, and 26f engage the notches 62 on the field core to accurately locate the upper housing member 26 with respect to both the stator 43 as well as with respect to the lower housing member 25. In this manner, accurate axial alignment of the upper armature bearing 38 and the lower armature bearing 39 is assured as well as the proper positioning of the armature 36 within the circular or cylindrical opening in the field 43.

Referring now to FIG. 8 of the drawings, it should be noted that the support posts which extend from the upper and lower housing members engage the field core 44 but do not extend into engagement with each other. As is shown in FIG. 8, the ends of the projections 25d and 26d as well as 25e and 26e are more than a quarter of an inch apart in their assembled relationship with the core 44 sandwiched between the two housing members 25 and 26. It should also be understood that the support projections 26c, 26d, 26e, and 26f engage the vertically extending sides of the core 44 but do not engage the horizontal or top surface of the core 44. The core 44 is retained in position on the lower housing member 25 by means of the assembly screws 55 and the projections 26c, 26d, 26e, and 26f serve no retaining function with respect to the core 44.

For the purpose of retaining the upper and lower housing members in assembled relation, there are provided four elongated screws 64, one of which is shown clearly in FIG. 2, and the rest of which are shown in section in FIGS. 6 and 7. The assembly screws 64 extending upwardly from the bottom through four rubber supporting feet 65 and through a bottom closure plate 66 into aligned vertically extending bosses 25g and 26g in the lower and upper housing members respectively. The bosses 25g in the lower housing member 25 are formed with clearance openings through which the screws 64 extend into threaded engagement with holes formed in the bosses 26g formed in the upper housing member 26. As is evident from the above description, the assembly screws 64 not only retain the upper and lower housing members in assembled relation, but also retain the rubber feet 65 and the closure plate 66 in position against the underside of the lower housing member 25.

To better understand the multiple functions performed by the housing members 25 and 26, attention is now directed to FIG. 5 of the drawings wherein the means for supporting the brush assemblies 68 is disclosed. The bottom wall of the lower housing member 25 is formed with an enlarged recess or cavity 69 which is defined on three sides by a vertical wall 70 and by a generally horizontally extending wall 71. As is evident from FIG. 9, the vertical wall 70 defines a generally circular chamber of gradually increasing radius as the wall is traced from the bottom around to the top as shown in FIG. 9. The wall 71 supports at its midpoint the lower armature bearing 39. Positioned immediately above the horizontally disposed wall 71 is the motor commutator 72. The brush assemblies 68 are supported on the wall 71 immediately adjacent the commutator 72. The details of the brush assemblies and their mountings are the subject of a separate invention which is disclosed and claimed in a copending application entitled COMMUTATOR BRUSH STRUCTURE FOR ELECTRIC MOTOR, Ser. No. 872,606, filed Oct. 30, 1969 in the name of John Walter concurrently with the instant application, now U.S. Pat. No. 3,579,007. For the purpose of the instant invention, it is sufficient to note that the brush assemblies consist of tubular supports 73 within which carbon brushes 74 are slidably received. The horizontal wall 71 is formed with the downwardly facing recesses 75 in which the tubular supports 73 of the brush assemblies 68 are received. The recesses 75 are formed by channel-like portions which extend above the general plane of wall 71 and locate the brush assemblies 68 with respect to the commutator 72. Spring clips 76 engage the bottom of the tubular supports 73 and retain the brush assemblies 68 within the recesses 75 with the brushes 74 biased into engagement with the commutator 72.

For the purpose of cooling the motor 30, there is provided within the recess 69 a cooling fan 77 which is secured to the lower end of the armature shaft 37. The fan 77 is formed with the conventional bent up vanes which, as the fan is rotated, cause air to be drawn inwardly through openings 66a in the bottom closure plate 66. As was explained above, the recess 69 is defined by vertical side wall 70 on three sides thereof and the horizontal wall 71. As is best shown in FIGS. 2 and 9 of the drawings, the side of the recess 69 which faces toward the switch 35 is provided with an opening 78 which permits air from the recess 69 to pass into a passageway 79 defined by a scoop-like duct or wall 80 which is formed integrally with the lower housing member 25. The wall 70 forms a scroll which directs the air circulated from the fan 77 into opening 78. Adjacent the ends of the scoop or curved wall 80 and extending upwardly from the wall 71 there are vertical wall members 81 and 82 as best shown in FIG. 6. The curved wall 80 along with the end walls 81 and 82 define the air conduit or passageway 79 which directs the motor cooling air upwardly against the field coil 45. The air which is thus directed upwardly also tends to pass inwardly across the rest of the motor field 43 and across the armature 36. It should also be noted that the recesses 75 formed in wall 71 to receive the brush assemblies 68 also provide limited access for motor cooling air which passes upwardly through the horizontal wall 71. This limited amount of air passing through the wall 71 flows across the brushes 74 and the commutator 72 thereby cooling these elements of the motor 30.

In order to further direct the air from the area beneath the coil 45 toward the armature 36, there are additional vertical walls 83 provided which extend between the locating projections 25f and 25e and the adjacent bosses 56. These walls 83 are shown in dotted lines in FIG. 6 as they are positioned beneath the edges of the field core 45, and one of the walls 83 is visible in FIG. 2 immediately to the right of the armature 36. Thus, the motor cooling air is drawn inwardly through the openings 66a in the closure plate 66 into the recess 69 by the fan 77. The air is directed by the scroll-like side walls 70 of the recess 69 into the passageway 79 which directs the air upwardly against the coil 45 while some of the air passes around the outer edges of the coil 45. Some of the cooling air passes under the coil inwardly across the armature 36 thereby maintaining the motor at a reasonable operating temperature.

The discharge of the cooling air from power unit 12 is accomplished by the air passing upwardly through the integrally formed supports 84 which carry at their upper ends the vessel support ring 24. As shown in FIG. 2, the supports 84 have internal openings or passageways 85 which communicate with a channel 24b in the interior of the support ring 24. Thus, the cooling air goes upwardly through the passageway 85 into the channel 24b and is then discharged into the spaces 87 between the supports 84 as is best shown in FIG. 1. On the basis of the description presented above, it can be appreciated that the means for directing the motor cooling air from the area adjacent the fan 77 until it is discharged from the power unit 12 is accomplished by means of walls which are formed integrally with the housing members 25 and 26. Thus, the housing members 25 and 26 perform the functions of supporting the various elements of the motor, providing a decorative housing for the power unit 12, and also as a duct or conduit means for the motor cooling air which is circulated across and through the motor.

The motor supporting projections 25c, 25d, 25e, and 25f serve the purpose also of separating and keeping the electrical leads from becoming entangled or engaged with the rotating armature. As is evident from FIGS. 2, 5, and 6, the power cord 50 extends between the outer wall of the housing members 25 and 26 and the aforementioned projections. As indicated in FIG. 6, the cord extends through a slot 86 after passing through the opening 51. In the area shown in FIGS. 5 and 6, the cord has been knotted for the purpose of providing a strain relief since the simple overhand knot does not fit through the slot 86 thereby preventing any force from being applied through the cord to the connections to the brushes or switches. A fibre wall or member 88 extends across the width of the enclosure 28 as is best shown in FIGS. 2 and 6 terminating at its bottom edge at the wall forming slot 86 through which cord 50 extends. The fibre wall 88 cooperates with the housing members 25 and 26 to form an area within which the excess portion of cord 50 may be stored. The user may simply push the unnecessary length of cord into the opening 51, and it will coil itself within the space between the fibre wall 88 and the outside wall of the housing. Although the details of the physical location of the wiring between the brush assemblies 68, the stator 43, and the switches 35 and 48 are not shown completely in the drawings, it can be seen from FIG. 6 that leads to the brush assemblies 68 are separated from the armature by walls 83. In addition, the leads 46 form the field coil to the switch 35 and extend over the walls defining air passageway 79 forwardly to switch 35 as shown in FIG. 2.

Although the support ring 24 was described above as having an internal channel 24b into which the motor cooling air is discharged, it should be noted that the channel 24b is interrupted by four support portions 90 as indicated in FIG. 5 and FIG. 7. Assembly screws 91 extend through apertured brackets 92 on the upper housing member 26 to thereby secure the support ring 24 to the upper housing 26 as is best shown in FIG. 5. As is evident from FIG. 7, the motor cooling air may pass into the channel 24b on either side of the assembly screws 91 and thereby pass outwardly through the openings 87.

For the purpose of drivingly connecting the motor 30 to the blade assembly 19, there is secured to the upper end of the armature shaft 37 a coupling member 94. The coupling member 94 consists of a circular plate 95 provided with a threaded hub portion 96 which is threadedly received on the end of the armature shaft 37. Molded to the plate 95 and the hub 96 is a rubber body portion 97 having four outwardly extending driving lugs 98. As is best shown in FIGS. 4 and 5, the driving lugs are angled on their rear surfaces 99 and provided with forwardly facing driving surfaces 100 which surfaces extend vertically and diametrically with respect to the axis of the armature shaft 37.

The coupling member 23 described above as being supported on the bottom of the vessel 14 on the stub shaft 21 is die cast and formed with four radially extending vanes 102 which are designed to fit in between the driving lugs 98 on the coupling member 94. The radially extending members 102 are formed with vertical driving faces 102a and sloping supporting webs 102b. This provides an arrangement in which the faces 100 on the lugs 98 drivingly engage the faces 102a on the coupling member 23. The sloping rear surfaces 99 on the lower coupling member and the sloping webs 102b on the upper coupling member provide an arrangement whereby the coupling members may be readily engaged with a minimum amount of interference.

The coupling provided by the members 23 and 94 has several advantages. Because of the manner in which the lugs engage the radially extending members 102, satisfactory drive is established between the motor 30 and the blade assembly 19 even though the shafts may not be in exact axial alignment. The rubber driving lugs 98 engage the die cast coupling member 23 to provide a strong, quiet, and effective coupling. In addition, as is evident from FIG. 2 which shows the lugs 98 engaged with the upper coupling member 23, it may be seen that the coupling member is of very limited axial height. As was mentioned above in connection with the problems associated with present day blenders, the overall height of the blender presents serious problems as far as storing the blender beneath the cabinets found in the normal kitchen. Accordingly, any space saving in the vertical dimensions of the blender is very important. The subject coupling member has the necessary strength to transmit the load to the blade assembly 19 and at the same time is axially compact.

As should be evident from the foregoing description, our invention including the plastic housing members 25 and 26 provides a means for achieving a functionally satisfactory blender while at the same time minimizing the number of parts involved and reducing costs to a minimum. The manner in which the motor elements are integrated with the housing members 25 and 26 contributes to an accurate and easy assembly of the parts with all the motor elements in precise alignment. The accurate alignment of the armature and field permits the improvement of motor efficiency by permitting small and accurate air gaps at the field pole faces. The improved cooling of the armature and field achieved through the use of air conduits and air directing means formed integrally with the housing improves heat transfer and allows the motor to operate more efficiently.

While there has been shown and described a single embodiment of the present invention, it will be apparent to those skilled in the art that various changes and modifications may be made without departing from the invention in its broader aspects and it is, therefore, contemplated in the appended claims to cover all such changes and modifications as fall within the true spirit and scope of the present invention.

What is claimed as new and desired to be secured by Letters Patent of the United States is:

1. A food blender power unit comprising a motor having an armature which includes an armature shaft, upper and lower frame members supporting said motor, vertically spaced bearings one on each of said frame members journalling said armature shaft extending vertically, a laminated field positioned between said frame members and adjacent to said armature, means on said upper frame member to support a vessel having mixing and blending means drivingly coupled to said motor, locating surfaces formed on said frame members and engaging said laminated field to align each said frame member by its engagement with said laminated field to locate said bearings in axial alignment and to locate said armature and field with a uniform air gap surrounding the armature.

2. The power unit of claim 1 wherein said frame members form a complete enclosure for said field and armature, assembly means extending between said upper and lower frame members to retain said members in assembled relation, a plurality of resilient supporting members positioned on the bottom of said lower frame member and retained thereon by said assembly means.

3. The power unit of claim 1 wherein said lower frame member is provided with a plurality of spaced vertically extending projections which engage and support said laminated field, said projections having first surfaces engaging said field in a plane normal to the axis of said armature shaft and second surfaces engaging the sides of said field to position said field in the plane normal to the axis of said armature shaft.

4. The power unit of claim 3 wherein said engaging surfaces on said projections comprise surfaces positioned at right angles to each other to engage the sides and lower faces of said field, means retaining said field in assembled relation against said projections independently of said upper frame member.

5. The power unit of claim 3 wherein said upper frame member is formed with downwardly extending locating projections which engage only the sides of said field and position the upper frame member with respect to said field in the plane normal to the axis of said armature shaft.

* * * * *